United States Patent
Ehmke et al.

(10) Patent No.: US 8,359,934 B2
(45) Date of Patent: Jan. 29, 2013

(54) SYSTEM FOR MEASURING LOADS DURING WHEEL/RAIL CONTACT OF RAIL VEHICLES

(75) Inventors: Fritz Ehmke, Modautal (DE); Peter Groll, Darmstadt (DE); Ralph Mueller, Darmstadt (DE)

(73) Assignee: Schenck Process GmbH (DE)

( * ) Notice: Subject to any disclaimer, the term of this patent is extended or adjusted under 35 U.S.C. 154(b) by 237 days.

(21) Appl. No.: 12/990,018

(22) PCT Filed: Apr. 1, 2009

(86) PCT No.: PCT/EP2009/002377
§ 371 (c)(1),
(2), (4) Date: Dec. 23, 2010

(87) PCT Pub. No.: WO2009/124681
PCT Pub. Date: Oct. 15, 2009

(65) Prior Publication Data
US 2011/0088487 A1    Apr. 21, 2011

(30) Foreign Application Priority Data
Apr. 9, 2008   (DE) .......................... 10 2008 018 076

(51) Int. Cl.
*G01L 1/04*   (2006.01)
*G01L 3/14*   (2006.01)
*E01B 9/00*   (2006.01)

(52) U.S. Cl. ............... 73/862.041; 73/862.621; 238/310

(58) Field of Classification Search .................. None
See application file for complete search history.

(56) References Cited

U.S. PATENT DOCUMENTS

| 4,773,591 | A | * | 9/1988 | Sonneville | 238/283 |
| 5,758,821 | A | * | 6/1998 | Wirthwein et al. | 238/366 |
| 2010/0200666 | A1 | * | 8/2010 | Bosterling et al. | 238/310 |
| 2012/0187206 | A1 | * | 7/2012 | Bosterling et al. | 238/264 |

FOREIGN PATENT DOCUMENTS

| DE | 10 2006 015 924 A1 | 10/2007 |
| EP | 0 468 397 A1 | 1/1992 |
| GB | 2 364 124 A | 1/2002 |

OTHER PUBLICATIONS

Peter Chlosta, "International Search Report for International Application No. PCT/EP2009/002377", Jul. 16, 2009, Publisher: European Patent Office, Published in: EP.

* cited by examiner

*Primary Examiner* — Andre Allen
(74) *Attorney, Agent, or Firm* — Kaplan Breyer Schwarz & Ottesen, LLP

(57) ABSTRACT

The object to configure a system for measuring loads during the wheel/rail contact of rail vehicles in such a manner that the occurring forces and/or torques can be measured in a reliable and realistic manner is solved by the present invention. Between the rail foot and the measuring device, at least one elastic element is arranged which has an elasticity which simulates the elasticity of a ballast bed. By means of the measuring system according to the invention, on the one hand, realistic conditions of a track system can be simulated and, on the other, a high metrological reproducibility of a load situation can be achieved.

16 Claims, 2 Drawing Sheets

SYSTEM FOR MEASURING LOADS DURING WHEEL/RAIL CONTACT OF RAIL VEHICLES

FIELD OF THE INVENTION

The invention relates generally to the technical field of rail vehicles and a system for simulating and detecting loads which occur during wheel/rail contact of rail vehicles. The invention relates in particular to a measuring system for detecting forces and/or torques which are caused by a rail vehicle and which act on a rail, wherein a rail foot is mounted in a receiving device which is arranged on a measuring device for detecting the forces and/or torques.

BACKGROUND OF THE INVENTION

In regard to a measuring section on a rail, a generic device is known, for example, from the document DE 10 2006 015 A1. It relates to a measuring section on a rail, comprising a plurality of diagnostic devices which are arranged spaced apart in the longitudinal direction of the rail and underneath the rail, and which detect the forces acting on the rail. For this purpose, the rail is immovably clamped onto an adapter plate which is supported via an intermediate plate on a load cell. The load cell is fastened to a carrier element which is anchored in a ballast bed. Between a rail foot and the load cell, foils or inflexible material plates, which are not described in more detail, are placed therebetween and are intended primarily for electrical insulation and for a reliable detection of the forces by the load cell and by an electrical evaluation unit connected to the load cell.

From GB 801912 A, a rail fastening is known wherein between a rail foot and a concrete sleeper, an intermediate plate consisting of rubber is placed which, on the one hand, effects an electrical insulation and, on the other, provides for an elastic support of the rail on the sleeper. The concrete sleeper is usually anchored in a ballast bed. A similar device is disclosed in DE 28 06 817 B1.

In DE 10 2005 057 473 A1, a measuring body is described which absorbs the forces acting on the rail and transfers said forces either into the sleeper or into a slab track. The term "slab track" generally designates a continuous concrete foundation which extends in the longitudinal direction of the rails and which replaces the otherwise usual ballast bed.

The use of load cells, as they are basically known from the document DE 39 37 318 A1, requires that deformation parts deform within the load cell under the action of the force to be measured, whereby the electrical resistance of the strain gages attached to the deformation parts changes, which can be detected as measured value. A precise measurement by means of deformation parts such as, e.g., load cells or strain gages, requires a construction of the measuring setup as rigid as possible.

On the other hand, such a rigid fastening system consisting of rail, receiving plate, measuring device and solid concrete track does not correspond to the realistic situation of a ballast track system. The deviation can lead to the situation that the changes of the electrical resistance of the deformation parts do not behave proportionally anymore to the forces to be measured as they occur in a realistic system. Also, an adhesive bond of the ballast can not result in a reliable manner in a realistic system. Therefore, the known devices can not be used for a realistic measurement of the forces and/or torques acting on the rail when a vehicle drives over the latter.

However, in practice there is a great demand for a device for measuring loads between rail vehicles and the track system which provides realistic as well as reproducible results. The request for measurements of realistic vertical wheel forces and lateral wheel forces (Q- and Y-forces) under preferably constant conditions is of particular importance.

The use of a slab track in combination with the use of elastic members and sensor systems between the rail and the foundation of the rail has so far not led to a satisfactory result, as explained above. In further known measuring systems, the sensor system is carried out through direct applications on real ballast track systems in a manner which is metrologically not optimal or is implemented by means of measuring tracks which do not correspond to the real behavior of a ballast track because the measuring tracks are constructed in a relatively stiff manner.

SUMMARY OF THE INVENTION

The invention is therefore based on the object to provide a system for measuring loads during the wheel/rail contact of rail vehicles with which the forces and/or torques occurring in the track system when loaded by a rail vehicle can be measured in an exact as well as realistic manner.

For this purpose, the invention provides that between the rail foot and the measuring device at least one elastic element is arranged which has an elasticity which simulates the elasticity of a ballast bed. In this manner, a ballast bed replacement with determinable and largely unchangeable properties can be set up in the measuring system, wherein the ballast bed replacement simulates the properties of a real ballast bed. Here, the mechanical properties and in particular the elasticity of the elastic element are selected such that they simulate the mechanical properties or, respectively, the elasticity of a real ballast bed for a track system.

The mechanical properties of the elastic element are significantly more constant compared to the mechanical properties of a real ballast bed, which allows to carry out a plurality of measurements under the same conditions. The properties and in particular the elasticity of the simulated ballast bed can be maintained largely unchangeable by means of the elastic element compared to the case of a real ballast bed. With the system according to the invention, therefore, a realistic as well as reproducible measurement of the forces which are caused by a driving or standing rail vehicle and which act on a track system is possible.

In one embodiment of the present invention, the elastic element is configured as an elastic insert or plate which is arranged between the rail foot and a receiving device for receiving the rail foot. In order to achieve optimal measurement results, said receiving device for receiving the rail foot is movably mounted on a foundation plate. The receiving device for receiving the rail foot can be designed, for example, as steel contour part or as concrete molding. The foundation plate is stationary and fixedly anchored. The movable mounting of the receiving device for receiving the rail foot allows a certain freedom of movement of the receiving device in the vertical direction and/or in the horizontal direction relative to the stationary foundation plate.

Thereby, the loads of a rail vehicle on the rail can cause movements of the receiving device of the rail in the vertical direction and/or in the horizontal direction relative to the foundation plate. The movements of the receiving device in the vertical direction and/or in the horizontal direction relative to the foundation plate can be detected by means of measuring fixtures, and from the measured values, the occurring loads on the rail can be determined. For this, preferably at least one measuring fixture is arranged between the device for receiving the rail foot and the foundation plate for detecting the forces acting on the rail and/or the torques generated due to the forces.

With this setup of the measuring system according to the invention, the influences of the elastic element or, respectively, the elastic plate or the elastic insert, which simulate the influences of a real ballast bed on a real track system, remain limited to the device for receiving the rail foot. Since the device for receiving the rail foot and the elastic element is decoupled from the rest of the measuring setup and the measuring fixtures are arranged on the movable coupling between the receiving device and the foundation plate, reliable and reproducible measurements at the movable coupling between the receiving device and the foundation plate can be performed.

The invention thus provides a measuring system in which no sensor system has to be provided in the ballast bed. In the measuring system according to the invention, the elastic elements or the elastic plates or inserts are arranged directly underneath the rail foot where they have an influence on the rail corresponding to the influence on real track systems. By separating the measuring fixtures from the elastic parts of the measuring setup, the measurements remain exact and reproducible under the same basic conditions.

For this, measuring fixtures for detecting the forces and/or torques acting on the rail in the vertical and/or horizontal direction (vertical wheel and lateral wheel forces) can be provided. Additionally or alternatively, measuring fixtures for detecting the forces (x/y-forces) or torques acting on the rail only in the horizontal direction can be provided. From the combination of the two vertical and horizontal degrees of freedom, a tilting moment of the rail under load can also be determined. The tilting moment of the rail can be controlled by fixing the elastic element or, respectively, elastic plate or insert transverse to the longitudinal direction of the rail.

By the elastic element underneath the rail foot, a measuring setup is provided which simulates the real situation of a track system with rails mounted on a ballast bed. The elastic element or, respectively, the elastic plate or insert offers a certain freedom of movement of the rail in the vertical direction as well as in the horizontal direction, which corresponds to the degree of freedom of the rail provided by a real ballast bed. The elastic element or, respectively, the elastic plate or insert thus provides a freedom of movement for the rail which corresponds to the freedom of movement of a real track system on a ballast bed.

In the measuring system according to the invention, besides the freedom of movement of the rail in the receiving device, further freedoms of movement are provided for the relative movement of the receiving device with respect to the foundation. Said freedoms of movement of the receiving device relative to the foundation are sufficient that strain-sensitive deformation parts of measuring fixtures of the measuring device such as, e.g., load cells or strain gages, can deform under the force and/or torque effect on the rail when loaded, and the occurring forces and/or torques can therefore be measured in a reliable, reproducible and realistic manner.

In an embodiment of the measuring system according to the present invention, the slab track allows to provide long-term stable conditions which make a higher metrological reproducibility possible. This means, on the one hand, that due to the variable or soft components in the structure of the device, the device according to the invention can provide such measuring conditions which come as close as possible to the realistic conditions of the respective load situation. On the other hand, due to the slab track and despite the variable or soft components in the structure of the device, a high metrological reproducibility of the load situation is maintained with the measuring device according to the invention.

With the measuring system according to the invention, the vertically acting vertical wheel forces and the horizontally acting lateral wheel forces (Q- and Y-forces) can be measured under conditions which remain as constant and realistic as possible. Furthermore, for testing rail vehicles, the relevant conditions for a potential derailing such as, e.g., the Y/Q-force couple or the x/y-force components acting in the horizontal plane, can be recorded in the curvature region with the measuring system according to the invention. In the normal ballast bed, such a measurement is hardly reproducible because a real ballast bed is not stable enough for this measurement.

The measuring system according to the invention can be used for measuring operational measured variables of rails such as, e.g. forces, torques or vibrations exerted on the track system by standing or driving rail vehicles. The measuring system according to the invention can in particular be used for detecting the drivability of rail vehicles in curves because during cornering, the risk of derailing is increased. To prevent this risk, based on the operational measurements recorded with the measuring system according to the invention, certain parameters on the rail vehicles can be changed such as, e.g., the wheel profile, the weight distribution or the wheel base, to improve the wheel/rail contact. Moreover, by means of the determined operational measured values, certain parameters of the track system can be changed such as, e.g., the curve radius or the rail profile.

BRIEF DESCRIPTION OF THE DRAWINGS

The invention is illustrated in more detail hereinafter by means of exemplary embodiments and the attached drawings. In the figures.

DETAILED DESCRIPTION

Figure 1:
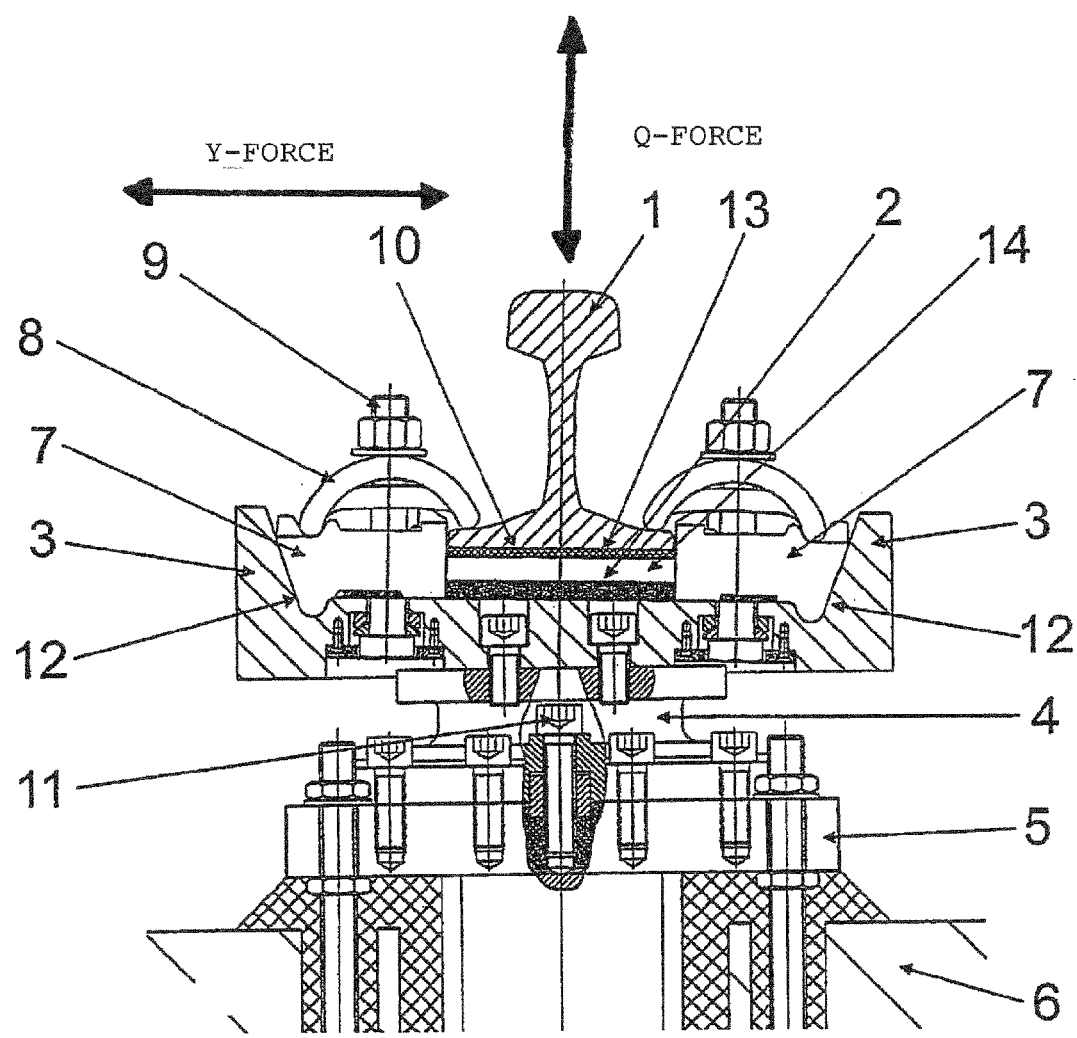
FIG. 1 shows a sectional view of a system according to an embodiment of the present invention for measuring forces and/or torques which act on a rail caused by driving or standing rail vehicles.

In the vertical sectional view of FIG. 1, the structure of the measuring system according to an embodiment is shown. A rail 1 of a rail track for rail vehicles, in particular high-speed trains, comprises a rail foot 10 which, in the assembled state illustrated in FIG. 1, is retained in a device 3 for receiving the rail foot 10. Said device 3 for receiving the rail foot 10 can be formed, for example, as steel contour part or as concrete molding. In the embodiment shown in FIG. 1, the device 3 for receiving the rail foot 10 is configured as steel part contour in the upper part of which a trough-shaped rail channel 12 is formed in such a manner that the rail foot 10 including fastener elements 7 can be received therein.

In the rail channel 12, the rail foot 10 of the rail 1 is fixed between two opposing angled guide plates 7 in each case by a tension clamp 8 acting on the rail foot 10 from above and by a rail screw 9 which is screwed in each case from above through the angled guide plate 7 and the tension clamp 8 into the concrete sleeper 3. In this manner, each of the two angled guide plates 7 rests in a positive locking manner in the profile or rail channel 12 of the concrete sleeper 3 and is fixedly anchored thereto by means of the sleeper screws 9. Thus, the rail 1 is fixed in the rail channel 12 of the rail receiving device 3 by the angled guide plates 7 in the horizontal direction and by the tension clamps 8 in the vertical direction.

In the case of curved rails, the angled guide plates 7 can be changed depending on the curve radius and can be replaced by suitable intermediate layers. The fastener components 7, 8, 9 for fixing the rail 1 can also be pre-assembled on the concrete sleeper 3, which allows a particularly economical construction of the rail fastening system or measuring system.

Underneath the rail foot 10, at least one elastic element is arranged which has an elasticity which largely corresponds to the elasticity of a ballast bed. Thereby, a ballast bed replacement with determinable and substantially unchangeable properties can be set up in the rail mounting of the measuring system, which replacement simulates the properties of a real ballast bed. In the embodiment illustrated in FIG. 1, an elastic insert or plate 2 is used as elastic element which is arranged between the rail foot 10 and the receiving device for receiving the rail foot 10, which device is configured as concrete sleeper 3.

The foundation plate 5 is immovably and tightly screwed into the foundation 6, wherein the foundation 6, for example, can be a slab track as it is used for rail guidance for high-speed trains. The sleeper 3 is not directly connected to the foundation plate 5 but is movably coupled to the foundation plate 5 via an articulated coupling 11. Said articulated coupling 11 can consist, for example, of a screw connection between the sleeper 3 and the foundation plate 5, wherein the screw connection allows a certain movability of the sleeper 3 relative to the foundation plate 5. The rail 1, the sleeper or the device 3 for receiving the rail foot 10, the elastic element, insert or plate 2 arranged therebetween and the fastening elements 7, 8, 9 thus can also be considered as an upper assembly 1, 2, 3 which is mounted movably relative to the foundation plate 5 and the slab track 6 via the articulated coupling 11.

The movable mounting of the receiving device or concrete sleeper 3 for receiving the rail foot 10 by means of the articulated coupling 11 allows a certain movability of the concrete sleeper 3 and thus the rail 1 relative to the immovable foundation plate 5 in the vertical and horizontal direction. Said freedom of movability can be limited, for example, via mechanical stops or a tilting protection. Furthermore, the freedom of movability of the upper assembly 1, 2, 3 can be adequately adjusted with respect to its stiffness and/or damping by means of suitable springs or dampers.

The rail 1 is subjected to forces caused by a rail vehicle standing thereon or driving over it, which forces are each indicated in FIG. 1 by the vertically and horizontally acting force couple (Q- and Y-forces or vertical wheel forces and lateral wheel forces, respectively) with double arrows. The loads of a rail vehicle cause forces, torques or vibrations at the rail 1 which, in the setup according to the invention, result in relative movements of the rail receiving device 1, 2, 3 with respect to the foundation plate 5. Said relative movements can be detected by means of measuring fixtures 4, and from the measured values, conclusions can be drawn concerning the loads on the rail 1 and the drivability of the rail vehicle.

For this purpose, for example, one or more measuring fixtures are arranged next to the articulated coupling 11 which detect forces, torques and/or vibrations of the rail 1. The concrete sleeper 3 of the upper assembly 1, 2, 3 thus is supported via the coupling 11 and the load cells 4 on the foundation plate 5 and the concrete bed 6 so that the measuring fixtures 4 can measure each movement of the upper assembly 1, 2, 3 relative to the foundation 5, 6. Thereby, the measuring fixtures 4 can also detect the force flow and the torque flow of the rail 1 in a direct manner. The measuring fixtures 4, for example, can be configured as load cells 4 or as so-called weighing disk which, for example, contain strain gage elements which detect the movement of the rail. The measuring signals of the measuring fixtures 4 are transmitted to a suitable evaluation unit (not shown) which evaluates the recorded measuring signals or measured values.

As the present description shows, in the measuring system according to the invention, the normal compacted or uncompacted ballast bed is replaced by a concrete bed which shows no elastic resilience under the load of the vehicle axles running over the rail. This missing elastic resilience of the concrete bed is replaced in the measuring system according to the invention by the elasticity of the elastic element or, respectively, the elastic insert or plate 2. The elastic element or, respectively, the elastic insert or plate 2 has, for example, a spring stiffness of approximately 22.5 kN/mm and thus allows a deflection of the rail under load of up to 1.5 mm.

As illustrated above, said elastic insert 2 is not located underneath the concrete sleeper 3, as this is the case for real track systems, but directly underneath the rail foot 10, namely between the rail foot 10 and the concrete sleeper 3. Depending on the requirements, it is also possible to use an intermediate plate with a different stiffness and/or a plurality of intermediate plates with different stiffnesses. It is also possible to arrange a number of elastic elements 2 and a number of rigid or metallic intermediate layers alternately stacked on top of each other underneath the rail foot 10, as described hereinafter.

Figure 2:
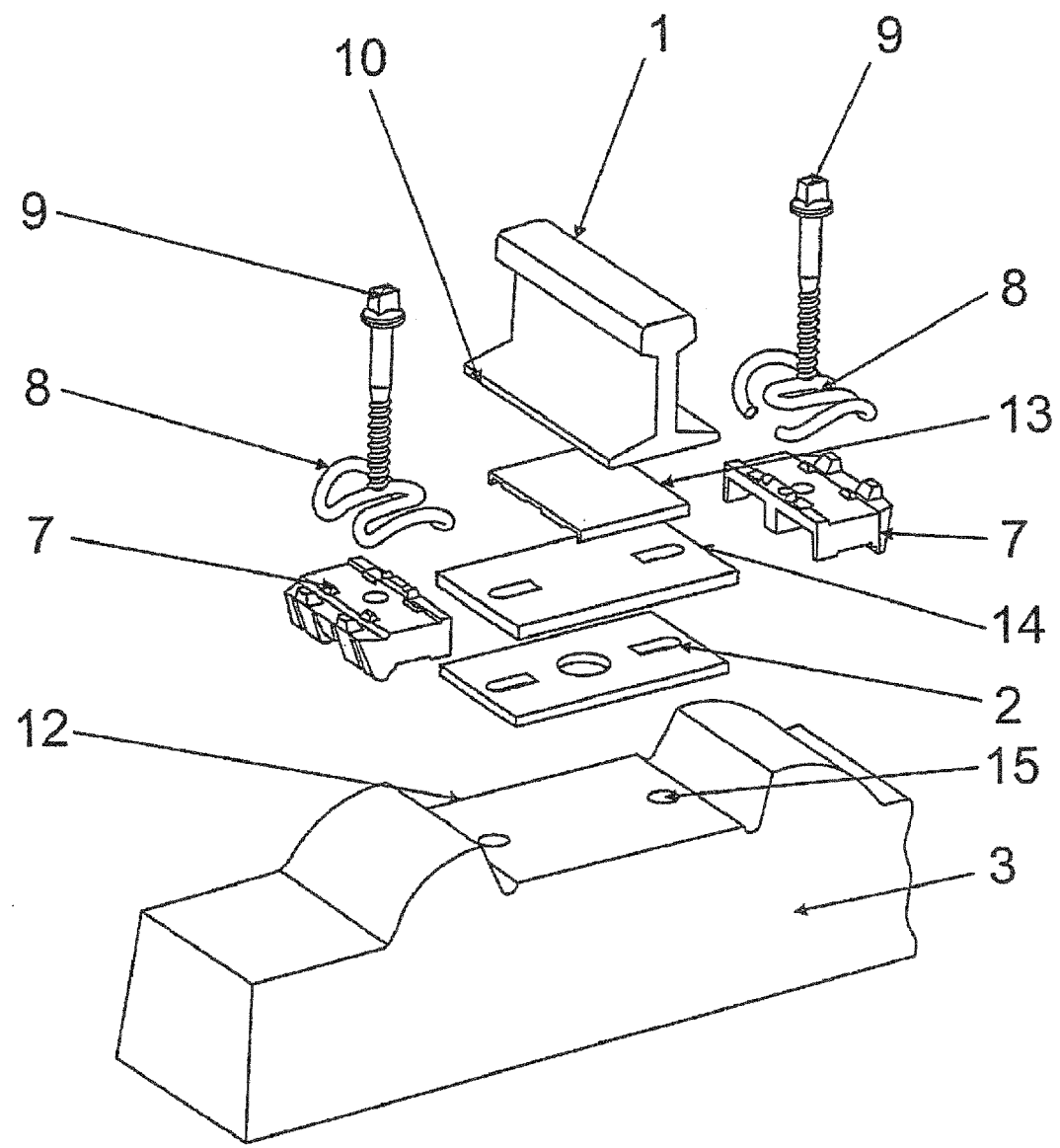
FIG. 2 shows a perspective exploded illustration of an upper assembly of the measuring system according to an embodiment of the method according to the present invention.

FIG. 2 shows a perspective exploded illustration of an upper assembly of the measuring system according to an embodiment of the method according to the present invention. In this embodiment, the upper assembly comprises substantially the rail 1, the receiving device 3 for receiving the rail foot 10, a number of elastic elements, inserts or plates 13, 14, 2 arranged therebetween as well as a plurality of fasteners 7, 8, 9.

FIG. 2 shows that in the concrete sleeper 3 configured as receiving device for receiving the rail foot 10, a rail channel 12 is formed which is dimensioned such that the rail foot 10 together with the two angled guide plates 7 can be received therein. Furthermore, bores 16 for the rail screws 9 are formed in the concrete sleeper 3 in the region of the rail channel 12.

With the outer spring arms, the tension clamp 8, which is W-shaped in the top view, holds the rail 1 elastically in its position in the rail channel 12 of the concrete sleeper 3, and on the side, the rail 1 is guided by the angled guide plates 7. The lateral forces coming from the rail 1 are transmitted via the angled guide plates 7 and the stack of layers with the plates 13, 14 and the elastic insert 2 onto the concrete body of the sleeper 3. Due to the tension clamp's 8 middle loop which protrudes the rail foot 10, the fastening system has a second stiffness which prevents an overloading of the spring arms of the tension clamp 8 or the plastic deformation of the same. The middle loop serves at the same time as tilting protection for the rail 1.

In the rail channel 12 of the sleeper 3, between the lower side of the rail foot 10 and the bottom of the rail channel 12, a sandwich-like stack consisting of layers made of different materials is arranged. In the embodiment illustrated in FIG. 2, this stack comprises, from top to bottom, an insulation plate 13, a metallic intermediate plate 14 and an elastic insert or plate 2. The insulation plate 13 can consist of an incompressible plastic and serves as electrical insulation against other electrically conductive parts of the rail fastening. The intermediate plate 14 can be made of metal and serves as spacer element for the rail foot 10 with respect to the sleeper 3.

The elastic insert or plate 2 consists, for example, of a hard-elastic plastic and has an elasticity which corresponds to the elasticity of a normal ballast bed for the rail 1. In this manner, the elastic insert or plate 2 simulates the influence of a ballast bed on the behavior of the rail when loaded by a standing or driving rail vehicle. Due to the simulation of a ballast bed by the elastic element or, respectively, the elastic insert or plate 2, the installation of a real ballast bed is not required, whereby it is still possible to achieve realistic and reproducible measured values.

While in the present description certain exemplary embodiments were described in detail and illustrated in the attached drawing, such embodiments are to be understood as being illustrative only and are not to be interpreted as being limiting for the scope of the invention. Therefore, it should be noted that different modifications of the described, illustrated or other embodiments of the invention can be carried without departing from the scope and the essence of the invention defined by the attached claims.

REFERENCE NUMBER LIST

1 Rail
2 Elastic element, elastic insert, elastic plate
3 Receiving device for receiving the rail foot or concrete sleeper
4 Measuring fixture or, respectively, load cell or weighing disk
5 Foundation plate
6 Foundation or slab track
7 Angled guide plate
8 Tension clamp
9 Sleeper screw
10 Rail foot
11 Articulated coupling between upper assembly 1, 2, 3 and foundation 3, 6
12 Rail channel in the concrete sleeper 3
13 Insulation plate
14 Intermediate plate
15 Bores for the rail screws 9 in the concrete sleeper 3

What is claimed is:

1. A system for detecting forces and/or torques that are caused by a rail vehicle and which act on a rail comprising:
    a rail foot mounted in a receiving device that is arranged on a measuring device for detecting the forces and/or torques,
    wherein, between the rail foot and the measuring device, at least one elastic element is arranged that simulates the elasticity of a ballast bed.

2. The system according to claim 1, wherein the elastic element is configured as elastic insert or elastic plate that is arranged between the rail foot and the receiving device for receiving the rail foot.

3. The system according to claim 1, wherein multiple elastic elements are arranged stacked on top of each other between the rail foot and the measuring device.

4. The system according to claim 1, wherein the rail foot is mounted on a plurality of elastic elements, elastic inserts or elastic plates.

5. The system according to claim 1, wherein multiple elastic elements with multiple rigid or metallic intermediate layers are arranged alternately stacked on top of each other between the rail foot and the measuring device.

6. The system according to claim 1, wherein the elastic element is configured as elastic insert or elastic plate that is received in the receiving device for receiving the rail foot in a positive locking manner and is arranged underneath the rail foot.

7. The system according to claim 1, wherein the receiving device for receiving the rail foot is configured as a concrete sleeper.

8. The system according to claim 1, wherein the receiving device with the rail foot received therein and the elastic element form a separate assembly that is movably mounted on a solid foundation.

9. The system according to claim 1, wherein the receiving device for receiving the rail foot is movably mounted on a foundation plate so that the receiving device is movable in a vertical direction and/or a horizontal direction relative to the foundation plate.

10. The system according to claim 9, wherein between the receiving device for receiving the rail foot and the foundation plate at least one measuring fixture for detecting the forces and/or torques acting on the rail is arranged.

11. The system according to claim 9, wherein the foundation plate is configured as slab track of a track system for rail vehicles or is arranged on a slab track.

12. The system according to claim 1, wherein measuring fixtures are provided for detecting the forces and/or torques acting on the rail in vertical and/or horizontal direction.

13. The system according to claim 1, wherein the elastic element is fixed transverse to the longitudinal direction of the rail.

14. The system according to claim 1, wherein the elastic element is made of a material whose mechanical properties correspond substantially to the mechanical properties of the ballast bed.

15. The system according to claim 1, wherein the elastic element is made of a material whose elasticity corresponds substantially to the elasticity of the ballast bed.

16. The system according to claim 1, wherein the system is provided in a measuring section that is part of a real track system for rail vehicles.

* * * * *

UNITED STATES PATENT AND TRADEMARK OFFICE
CERTIFICATE OF CORRECTION

PATENT NO. : 8,359,934 B2  Page 1 of 1
APPLICATION NO. : 12/990018
DATED : January 29, 2013
INVENTOR(S) : Ehmke et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 252 days.

Signed and Sealed this
First Day of September, 2015

Michelle K. Lee
*Director of the United States Patent and Trademark Office*